United States Patent [19] [11] 3,732,440
Platt et al. [45] May 8, 1973

[54] ADDRESS DECODER LATCH

[75] Inventors: Steven Platt, Underhill, Vt.; Jehoshua N. Pomeranz, Suffern, N.Y.

[73] Assignee: International Business Machines Corporation, Armonk, N.Y.

[22] Filed: Dec. 23, 1971

[21] Appl. No.: 211,619

[52] U.S. Cl. ..................307/289, 307/238, 307/296, 307/299 A, 340/173 FF
[51] Int. Cl. ...H03k 3/286, H03k 3/295, G11c 11/40
[58] Field of Search......................307/213, 215, 218, 307/238, 289, 290, 291, 292, 299, 299 A, 296, 297; 340/173 AM, 173 FF

[56] References Cited

UNITED STATES PATENTS

| | | | |
|---|---|---|---|
| 2,825,821 | 3/1958 | Logue | 307/290 |
| 3,283,170 | 11/1966 | Buie | 307/299 A |
| 2,964,655 | 12/1960 | Mann | 307/290 |
| 3,226,574 | 12/1965 | Winkler | 307/292 X |
| 3,449,727 | 6/1969 | Pricer | 307/290 X |
| 3,449,728 | 6/1969 | Henle et al. | 307/290 X |
| 3,611,318 | 10/1971 | Heightley et al | 307/238 X |
| 3,617,772 | 11/1971 | Tertel | 307/291 X |
| 3,621,302 | 11/1971 | Pricer | 307/291 |
| 3,624,620 | 11/1971 | Andrews | 307/289 X |

OTHER PUBLICATIONS

Blount et al., "Di–istor Speed–up Word Drive with Resistor Word Bottom," IBM Technical Dis. Bull. Vol. 14, No. 6, p. 1734–1735, 11/1971.
Moore, "Current Balancing System," IBM Tech. Dis. Bull., Vol. 14, No. 1, p. 170, 6/1971.
Wiedman, "Monolithic Integrated Storage Cell", IBM Tech. Dis. Bull Vol. 13, No. 6, p. 1728, 11/1970
Palfi, "Monolithic Memory Cell," IBM Tech. Dis. Bull., Vol. 13, No. 5, pp. 1108–1109, 10/1970.
Harper, "Monolithic Resistors," IBM Tech. Dis. Bull., Vol. 13, No. 2, p. 230, 7/1970.
McDowell, "Bilevel Power Storage Cell," IBM Tech. Dis. Bull., Vol. 14, No. 6, p. 1678, 11/1971.
Palfi, "Monolithic Memory Cell," IBM Tech. Dis. Bull, Vol. 13, No. 5, p. 1107(a), 10/1970.

*Primary Examiner*—John W. Huckert
*Assistant Examiner*—L. N. Anagnos
*Attorney*—George O. Saile et al.

[57] ABSTRACT

A dual condition latch circuit is disclosed which changes from an unlatched to a latched condition when a set input is applied only when a signal input from a logic gate is at a first level, and remains in the latched position after the signal input is removed. A first and second transistor with their emitters commonly connected to a current source and the collector of the first transistor connected to the base of the second transistor with a resistor connected between the collector of the first transistor and a reference point and the collector of the second transistor connected directly to the reference point constitutes the basic latching circuit. A set input pulse is applied to the base of the first transistor and a signal input level from a logic device is applied to the base of the second transistor such that only when the signal input is at a first level does the second transistor switch "on" when the set input pulses the first transistor from a conducting to a nonconducting state. If the signal input is not at a first level when the set input pulses the first transistor, the second transistor does not switch "on" and the circuit remains in an unlatched condition.

4 Claims, 2 Drawing Figures

ADDRESS DECODER LATCH

FIELD OF THE INVENTION

This invention relates to a latch circuit and more particularly to a transistor latch circuit in which latching is determined by two separate inputs.

PRIOR ART

Various functional electronic devices such as memory cells in a bipolar transistor memory array, are normally bilevel-powered to reduce the overall power to reasonable levels. In such circuits a signal input means determines when a particular device is to be addressed with the power to the signal input means remaining in an "on" condition during the entire period for which the functional unit device is addressed. For example, in a memory environment when a particular memory cell or group of memory cells is to be addressed, address inputs must be continuously applied to a signal input means such as a decoder for the memory cell or cells to be addressed. Not only does such a situation result in power consumption, but more importantly, serious over-heating problems may result.

Presently existing latch circuits require inputs to the circuit to remain "on" after the circuit has been pulsed for latching for the circuit to remain latched. Thus, the same problem of power consumption and over heating are still present.

OBJECTS

Therefore, it is a primary object of this invention to activate in an improved manner a functional electronic device without continuously applying the activating signal.

It is a further object of this invention to reduce the power dissipation requirements of a transistor memory array.

It is still a further object of this invention to logically control whether or not a latch circuit switches to a latch condition.

SUMMARY OF THE INVENTION

The above objects are accomplished by means of a latch circuit which latches according to an activating signal input means such as a logic gate and remains latched after the activating signal is removed. The latch circuit consists of a first and second transistor with their emitters commonly connected to a functional electronic device to be activated, the device in turn being connected to a constant current source. The collector of the first transistor and the base of the second transistor are commonly connected to the signal input means, and a resistor is connected between the collector of the first transistor and a reference point, the reference point being directly connected to the collector of the second transistor. The base of the first transistor is connected to a set input means which provides pulses that switch the first transistor from a conducting to a nonconducting state. When this switching action of the first transistor takes place, the switching from a nonconducting to a conducting state of the second transistor depends entirely upon the input from the signal input means. If the signal input means is such that the second transistor switches to a conducting state, when the switching is completed, the signal from the signal input means returns to its previous level and the signal input means may be powered down without effecting the latched condition of the circuit.

In an alternate form, the above circuit may have the emitters of the first and second transistors connected directly to a current source and use the voltage level at the common connection of the emitters of the first and second transistors to operate a functional electronic device having a high input impedance connected thereto. The latching function of the circuit would operate in the same way as described with the functional electronic device in series with the latch circuit and the constant current source, requiring only that the signal input means be applied to the latch circuit during the switching period and not continuously maintaining the latch in its latched position.

In either circuit configuration, once the circuit is pulsed by the set input means, the latch circuit remembers its condition, permitting the signal input means to be powered down. This reduction in power permits a higher power level to be employed without increased heat dissipation problems.

The preferred circuit is quite useful in a transistor memory array where the functional electronic device is a single memory cell or a plurality of memory cells connected in parallel between the common connection of the emitters of the first and second transistors and the constant current source. In such an environment, the signal input means is a logic device having a bilevel output. A reset means may be connected to the signal input means to cause the signal input means at the appropriate time to apply a signal as the base of the second transistor which causes the second transistor to switch from a conducting to a nonconducting state and thus, the first transistor from a nonconducting to a conducting state, returning the circuit to its unlatched state.

DETAILED DESCRIPTION

Figure 1:
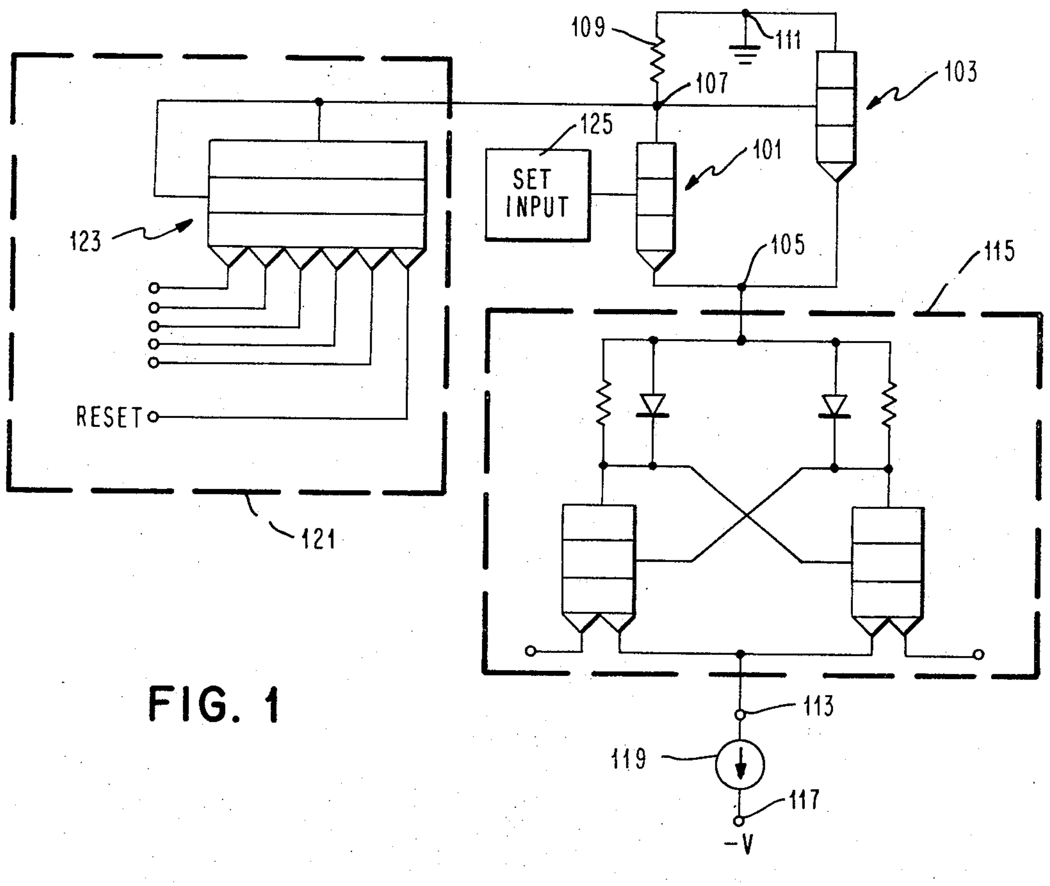
FIG. 1 shows the preferred embodiments of the latched circuit as used in a memory environment.

FIG. 1 illustrates the latch circuit in a memory environment. The basic latch circuit consists of NPN transistor 101 and NPN transistor 103 with their emitters connected to a common point 105 and the collector of transistor 101 and the base of transistor 103 connected to point 107. Resistor 109 is connected between point 107 and a first reference point 111, reference point 111 in turn connected to the collector of transistor 103. Between first common point 105 and second point 113, a functional electronic device 115 is connected and between the second common point 113 and a second reference point 117, constant current source 119 is connected. In this particular circuit, the first reference point 111 is at a ground potential and the second reference point is at a negative potential sufficient to maintain a predetermined level of current flowing from constant current source 119, usually on the order of 0.8 milliamps. Functional electronic device 115 may be any electronic device which requires voltage level changes at specified times. In FIG. 1, functional electronic device 115 is represented by a bistable multivibrator which functions as a single memory cell. However, the single memory cell depicted as functional electronic device 115 may be replaced by a plurality of functional electronic units, for example memory cells in parallel between common points 105 and 113. The operation of the functional electronic device 115 need not be described for this discussion other than to note the requirements that the current delivered to the functional electronic device 115 by constant current source 119 be the same as the current exiting from functional electronic device 115 at common point 105 and that functional electronic device 115 be a bilevel device.

Connected to the base of transistor 103 is the signal input means 121 which provides a bilevel signal to point 107. In the particular case shown in FIG. 1, signal input means 121 is represented by a multiemitter transistor 123 with its collector connected to point 107 and its base shorted to its collector. In this particular configuration, signal input means 121 functions as a positive-AND device. The emitters of transistor 123 are connected to various logic devices (not shown) which deliver a particular address signal to the emitter electrodes of transistor 123. This address determines the level output of transistor 123 and thus the bilevel condition of point 107. One electrode of multiemitter transistor 123 may be reserved as a reset electrode which at a predetermined time is biased so as to change the output level at point 107 resetting the latch circuit.

A set input means 125 is connected to the base of transistor 101. Set input means 125, which is nothing more than a common pulse generator well known in the art, delivers a pulse to the base of transistor 101 at a predetermined time after the bilevel condition of signal input means 121 is set which switches transistor 101 from a conducting to a nonconducting state. The pulse width may be on the order of a few nonoseconds.

OPERATION

Using NPN transistors in the latch circuit and with the first reference point 111 at ground potential, constant current source 119 is negatively biased at reference point 117 so as to produce a current I, usually on the order of 1 milliamp, between first reference point 111 and second reference point 117. In the SET position, all of the emitter electrodes of the multiemitter transistor 123 are positively biased with respect to point 107, thus maintaining transistor 123 in a cut-off state. Set input means 125 holds the base of transistor 101 at a level more positive than the emitter of transistor 101 causing, transistor 101 to conduct. Since transistor 101 is conducting, the voltage at point 107 which is the base of transistor 103 is negative with respect to the emitter of 103 and transistor 103 is in the cut-off state. The voltage level at point 105 is then equal to the voltage of the set input means with respect to ground minus the base to emitter voltage of transistor 101. If functional (a selected mode) electronic unit 115 has been selected to be switched to an "on" condition, all of the emitters of multi-emitter transistor 123 remain at a high level, continuing to back bias multiemitter transistor 123. If functional electronic unit 115 is not selected to be switched "on" (a nonselected mode), one or more of the emitters of multiemitter transistor 123 is biased negative with respect to point 107 forward biasing multiemitter transistor 123.

In the selected mode, when multiemitter transistor 123 remains reversed biased, set input means generates a negative going pulse which causes transistor 101 to switch from a conducting to a nonconducting state. The value of the negative going pulse must be such as to make the base of transistor 101 negative with respect to point 107. Since multiemitter transistor 123 is reversed biased, the current I which is flowing from first reference point 111 through resistor 109 and transistor 101 begins to flow from first reference point 111 through resistor 109 and into the base of transistor 103. As this takes place, the potential at point 107 begins to rise towards the same potential as first reference point 111, in this case ground potential. As the potential of the base of transistor 103 rises, the base to emitter voltage of transistor 103 becomes positive and transistor 103 switches from a nonconducting to a conducting state. Thus, the current flowing through functional electronic device 115 and generated by constant current source 119 flows from first reference point 111 through transistor 103 to common point 105. By this time the base of transistor 101 has been returned to its previous level; however, common point 105 has risen to a value equal to the base-to-emitter voltage of transistor 103. Thus, the base of transistor 101 is no longer more positive with respect to its emitter and transistor 101 remains in the cut-off state. With the latch circuit in the latched mode, the inputs to the emitters of multiemitter transistor 123 may be powered down, thus conserving power consumption.

When the addressed or selected functional electronic device 115 is no longer necessary, one of the emitter electrodes, which functions as a reset, of multiemitter transistor 123 is biased so as to forward bias multiemitter transistor 123. This causes the potential at point 107 to drop with the result that transistor 103 switches from a conducting to a nonconducting state. The voltage potential at common point 105 drops such that the base of transistor 101 becomes positive with respect to its emitter and transistor 101 switches from a nonconducting to a conducting state. In this way, the latch circuit is once again in the SET position with the potential level at point 105 at its lower level.

In the nonselected mode of operation, that is, when functional electronic device 115 is not to be addressed, one or more of the emitter electrodes of multiemitter transistor 123 is biased so as to forward bias multiemitter transistor 123. Thus, when a negative pulse is delivered to the base of transistor 101 by set input means 125, transistor 101 switches from a conducting to a nonconducting state but, because of the forward bias multiemitter transistor 123, point 107 remains at its previous level and the base of transistor 103 remains negative with respect to the emitter of transistor 103. At the end of the negative going pulse from set input means 125, transistor 103 remains in the nonconducting state and point 105 remains at its lower level With point 105 at its lower level, the base-to-emitter voltage of transistor 101 is positive and transistor 101 switches back from a nonconducting to a conducting state, ready to be addressed at a future time.

When transistors 101 and 103 are NPN transistors, resistor 109 has a value of 1.5 kilo-ohm, and the current I of constant current source 119 is 0.8 milliamps, the following circuit values result in the SET condition, a −0.75 volts is maintained by set input means 125 on the base of transistor 101. Since transistor 101 is conducting and its base-to-emitter voltage is 0.75 volts, the potential at point 105 is −1.5 volts, at point 107, −1.2 volts, and the base-to-emitter voltage of transistor 103 is 0.3 volts, holding transistor 103 in the cut-off state. The potential of each of the emitters of multiemitter transistor 123 is at −0.75 volts, reverse biasing multiemitter transistor 123.

When the functional electronic device 115 is "selected" to be turned "on," all of the emitters of multiemitter transistor 125 remain at −0.75 volts. A negative going pulse of −1.5 volts of short duration, a few nanoseconds, is applied to the base of transistor 101 which causes transistor 101 to cut-off and current begins flowing into the base of transistor 103. The voltage at point 107 begins to approach ground potential, turning transistor 103 "on." With transistor 103 conducting and transistor 101 nonconducting, the potential at point 105 is that of the base-to-emitter voltage of transistor 103, which is −0.75 volts.

When the latch circuit is to be reset, a −2.0 volts is applied to one of the emitters of multiemitter transistor 123, causing multiemitter transistor 123 to become forward biased and the potential at point 107 to drop. As this potential drops, transistor 103 cuts off and transistor 101 switches "on."

When functional electronic device 115 is "non selected" to be turned "on," one or more of the emitters of multiemitter transistor 123 has a voltage of −2.0 volts applied to it, forward biasing multiemitter transistor 123. Thus, when a negative going pulse of −1.5 volts is applied to the base of transistor 101, transistor 101 cuts off but point 107 does not rise towards ground potential, so transistor 103 does not turn "on." At the end of the pulse to the base of transistor 101, transistor 101 begins conducting again and the latch circuit remains in the SET state with point 105 at a potential of −1.5 volts.

While the operation has been described specifically referring to the functions of multiemitter transistor 123, it should be noted that any signal input means which can function so as to provide the bilevel potentials at point 107 is sufficient for the operation of the latch circuit. Numerous logic devices are suitable for this function.

Figure 2:
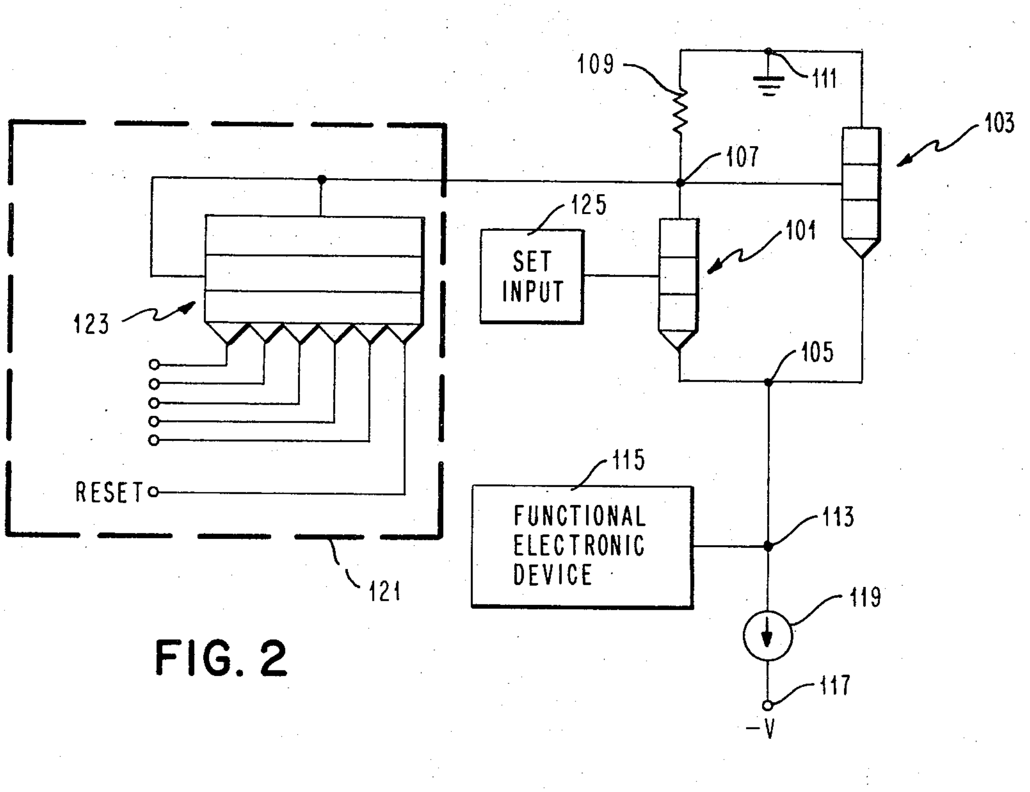
FIG. 2 shows an alternate embodiment of the invention in which the functional electronic device is not connected in series between the latch circuit and the constant current source.

An alternate embodiment of the invention in which functional electronic device 115 is not connected in series between point 105 and common point 113 is shown in FIG. 2. The latching function of the circuit shown in FIG. 2 is the same as that of the circuit shown in FIG. 1 with the voltage potentials switching between a high and a low at point 105. The only requirement here is that any functional electronic device 115 which is connected to point 105 must have a sufficiently high input impedance so as not to adversely affect the current flows in the latch circuit. Other than the difference in the connection of functional electronic device 115, the latch circuit of FIG. 2 performs as the latch circuit of FIG. 1 in that once the circuit is latched, that is transistor 103 is conducting and transistor 101 is cutoff, the inputs to the emitter electrodes of multiemitter 123 may power down without affecting the latch circuit.

The advantages of the circuit now become apparent. The latch circuit permits latching to take place and once this has occurred, remains in that position until reset, even though the input power which resulted in the latching has powered down. This conservation of power results in less heating of the electric components. This is extremely valuable in modern day integrated circuit technology where an entire matrix of functional electronic devices may be contained on one chip. In a memory environment, the latch circuit effectively latches the address of the memory cell at a array chip address driver, resulting in very short decoder system power-on times and favorably affecting the overall power performance of the memory.

It should be pointed out that while the semiconductor devices were referred to as NPN transistors, by reversing the respective polarities within the circuit, a similar PNP transistor circuit may be employed.

While the invention has been shown and described with reference to the preferred embodiments thereof, it will be understood by those of skill in the art that various changes in form and detail may be made therein without departing from the spirit and scope of the invention.

We claim:

1. A latch circuit requiring two conditional inputs to latch and remaining latched after the inputs are removed comprising:

a first transistor having a first collector electrode, a first base electrode, and a first emitter electrode;

a second transistor having a second collector electrode, a second base electrode connected to said first collector electrode and a second emitter electrode connected to said first emitter;

a resistor connected between said first collector electrode and a first reference point, said first reference point also connected to said second collector electrode;

a current source having a first electrode connected to a second reference point and a second electrode;

a memory cell device connected between a first common point connected to said first and second emitter electrodes, and a second common point connected to said second electrode of said current source;

a set input means connected to said first base electrode of said first transistor, wherein said set input means switches said first transistor from a conducting to a nonconducting state;

a signal input means having a first output level and a second output level, connected to said second base electrode;

wherein said second transistor goes from a nonconducting to a conducting state when said first output level is present and said first transistor goes from a conducting to a nonconducting state;

and wherein said second transistor remains in a nonconducting state when said second output level is present and said first transistor goes from a conducting to a nonconducting state.

2. The latch circuit of claim 1 wherein said memory cell device consists of a plurality of memory cell units connected in parallel between said first common point and said second common point.

3. The latch circuit of claim 1 wherein said signal input means is a third transistor having a third base electrode and a third collector electrode connected to said second base electrode, and a plurality of emitter regions each having an emitter electrode, and further comprising:

a bilevel input means connected to each emitter electrode of said plurality of emitter regions having a first input level and a second input level wherein said third collector electrode is at said second output level when at least one emitter electrode in said third transistor is at said second input level.

4. The latch circuit of claim 3 further comprising:

a reset input means connected to one of said emitter electrodes of said third transistor wherein said reset input means switches said third transistor from a nonconducting to a conducting state.

* * * * *